United States Patent

[11] 3,615,808

| [72] | Inventors | Peter Eckert<br>Magden;<br>Anton Eisener, Birsfelden, both of<br>Switzerland |
|---|---|---|
| [21] | Appl. No. | 734,524 |
| [22] | Filed | June 5, 1968 |
| [45] | Patented | Oct. 26, 1971 |
| [73] | Assignee | Ciba Limited<br>Basel, Switzerland |
| [32] | Priority | June 16, 1967 |
| [33] | | Switzerland |
| [31] | | 8581 |

[54] NONFLOCCULATING PIGMENT PREPARATIONS AND PROCESSES FOR THEIR MANUFACTURE
3 Claims, No Drawings

[52] U.S. Cl. .................................................. 106/288 Q, 106/308 N, 106/193, 260/15
[51] Int. Cl. ........................................................ C08h 17/02
[50] Field of Search ............................................ 106/288, 308, 195, 193; 260/15

[56]  References Cited
UNITED STATES PATENTS

| 2,851,371 | 9/1958 | Stephens ...................... | 106/193 |
| 3,075,849 | 1/1963 | Dreher et al. ................. | 106/177 |
| 3,288,619 | 11/1966 | Buehler et al. ................ | 106/193 |
| 3,291,627 | 12/1966 | Hamilton...................... | 106/195 |

FOREIGN PATENTS

| 100,387 | 2/1937 | Australia..................... | 106/288 |

Primary Examiner—James E. Poer
Assistant Examiner—Jacqueline V. Howard
Attorneys—Harry Goldsmith, Joseph G. Kolodny, Bryant W. Brennan and Edward J. Sites ABSTRACT: The present invention concerns a nonflocculating pigment preparation which contains a pigment and 2 to 20 percent of cellulose nitrate and a process for its manufacture wherein a pigment and cellulose nitrate are mixed together. These preparations are useful for coloring plastic masses and lacquers.

NONFLOCCULATING PIGMENT PREPARATIONS AND PROCESSES FOR THEIR MANUFACTURE

Pigments which are dispersed in liquid media, especially in lacquers, often have the undesirable habit of flocculating, that is to say, the finely divided pigment particles form agglomerates.

Generally, this agglomeration process is reversible, that is to say, the pigment particles can be redispersed by stirring and mixing the lacquer. However, if a coating of lacquer, which may have been applied, for example, by dipping or brushing, is allowed to dry slowly, the pigment particles have plenty of time to form agglomerates while the lacquer is drying. This results in a weaker coloration than would normally be expected due to the increase in particle size.

The so-called spraying, pouring, and rubbing test has established itself as the test for pigment flocculation. In this test, an alkyd-melamine resin/xylene stoving lacquer, for example, is pigmented with a mixture of a color pigment and titanium dioxide, sprayed on to a piece of sheet metal and stoved. A quantity of the same kind of lacquer is then poured over part of the sprayed and stoved sheet metal, an area thereof is rubbed with the finger and the sheet is again stoved. The difference in shade between the sprayed and the poured lacquer on the one hand and between the untouched poured lacquer and the rubbed area on the other indicates the degree of flocculation.

It is a well-known fact that this phenomenon is particularly associated with copper-phthalocyanine, and many methods for preventing the flocculation of copper-phthalocyanine have been proposed, for example, by the addition of tin-, cobalt-, manganese-, magnesium-, aluminium-, titanium- or vanadium-phthalocyanine, or by the addition of a substituted copper-phthalocyanine, for example, a monochloro-copper-phthalocyanine, a copper-phthalocyanine-sulphonamide, an aminomethyl-phthalocyanine or a hydroxyalkylphthalocyanine, to mention only a few. To achieve good resistance to flocculation, these substances have to be added in amounts of 5 to 10 percent, which results in an undesirable change in the shade of the copper-phthalocyanine. Attempts have also been made to improve the stability of phthalocyanine pigments towards flocculation by enveloping the pigment particles in polyvinyl chloride, by the addition of wetting agents and by adjusting the pH. The use of cellulose derivatives, for example, ethyl cellulose, benzyl cellulose or dynamite nitrocellulose as lacquer additives has been mentioned in the literature, but their efficacy has been described as inadequate. In fact it has been described in U.S. Pat. No. 1,851,371 how phthalocyanine must be prevented from flocculating in a nitrocellulose lacquer by the use of other additives.

The present invention provides a process for rendering any organic or inorganic pigment nonflocculating without the disadvantages mentioned above, wherein the pigment is mixed with cellulose nitrate and, if desired or required, an additional support substance, for example, a polyamide or a cellulose ether, for example, ethyl cellulose, benzyl cellulose or hydroxyethyl cellulose.

The pigments used may be any inorganic pigment, but especially organic pigments, for example, pigments of the azo, anthraquinone, phthalocyanine, nitro, thioindigo, perinone, perylene tetracarboxylic acid diimide, dioxazine or quinacridone series.

It is advantageous to use a nitrocellulose of the kind commonly employed in the manufacture of lacquers, preferably a nitrocellulose having a nitrogen content of 10.5 to 12.5 percent, especially 10.5 to 12 percent. It is expedient to use not more than 20 parts, preferably 2 to 12 parts, of nitrocellulose for each 100 parts of pigment. The nitrocellulose may be used in the form of chips or dissolved in an organic solvent.

Ethyl acetate, for example, may be used as solvent, but the preferred solvents are those which are miscible with water, for example, acetone, methyl ethyl ketone, or especially an ethylene glycol monoalkyl ether, for example, the monomethyl ether or monoethyl ether. It is expedient to use solutions which contain 5 to 20 percent of nitrocellulose.

An intensive mechanical treatment is necessary to ensure that the cellulose nitrate is thoroughly mixed with the pigment. This can be effected by vigorous stirring, grinding or preferably kneading. The kneading operation is advantageously carried out in the presence of grinding media, for example, inorganic salts, for example, sodium chloride, potassium chloride, sodium sulfate or barium chloride, which substances can easily be washed out with water. It is generally advantageous to add an organic solvent, preferably an organic solvent which is miscible with water, for example, ethylene glycol, glycerol, glycol monoethyl ether, methyl ethyl ketone or diacetone alcohol.

In many cases it may also be advantageous to add a plasticizer, provided the nitrocellulose does not already contain one.

The mechanical treatment may be carried out in apparatus of known design, for example, in stirrers and mixers made for the processing of relatively viscous media. It may also be carried out on roller mills and especially in kneaders of the Werner and Pfleidarer types. Kneading may be carried out at room temperature or at higher or lower temperatures.

When the pigments used are in a fairly coarse state of division, the mechanical treatment can reduce the particle size of the pigment as well as effect mixture with the nitrocellulose. This means that one operation can be omitted in many cases.

The treatment is continued until the nitrocellulose and the pigment are intimately mixed. When the pigment to be processed is already in a state of division which is sufficiently fine for the required application, the time of treatment may be comparatively short. When a coarse pigment is used, the mechanical processing will naturally take much longer.

When the mixing process is carried out in the presence of an organic solvent, the latter may be removed by evaporation, if necessary, in vacuo, for example, by spray drying. It is especially advantageous to separate the impregnated pigment from the solvent by the addition of water, the nitrocellulose being precipitated on to the pigment particles. The particles are thus coated with nitrocellulose. The preparations may easily be isolated by filtration.

The pigment preparations obtained in accordance with the invention may be used for a very wide variety of lacquers, for example, alkyd resin lacquers, alkyd-melamine resin lacquers or acrylic resin lacquers, and also for printing inks and paints, it being immaterial whether the cellulose nitrate used is soluble or insoluble in the binder. However, it is vital to the antiflocculating effect that the pigment be intimately mixed with the cellulose nitrate before the preparation is worked into the lacquer, printing ink, or paint. Subsequent additions of cellulose nitrate to the lacquer, printing ink, or paint bring about only a marginal improvement in the stability towards flocculation.

The following examples illustrate the invention. Unless otherwise stated, the parts and percentages are by weight.

EXAMPLE 1

Twenty five parts of a commercially available β-copper-phthalocyanine pigment are kneaded for 30 minutes together with 12.5 parts of a 10 percent solution of cellulose nitrate (nitrogen content: 10.8 percent) in ethylene glycol monoethyl ether in a divided trough kneader. A further 30 parts of ethylene glycol monoethyl ether are gradually added during the kneading process to maintain a mixture capable of being kneaded. On completion of the kneading process, the pigment is precipitated together with the cellulose nitrate by the addition of 30 parts of deionized water. After further dilution with water, the batch is filtered, washed with water and then dried at 60° C. under a pressure of 15 mm. Hg. A dry, crumbly substance is obtained that may be comminuted by known methods.

Five parts of the pigment preparation obtained in the manner described in the preceding paragraph are ground for 16 hours in a ball mill in 95 parts of a thermosetting acrylic resin lacquer.

Composition of the thermosetting acrylic resin lacquer:

Fifty five parts of Baycryl L 530 (Farbenfabriken Bayer) (50 percent xylene/n-butanol 3:1), 27 parts of Maprenal TTX (55 percent in n-butanol) (Cassella), 12 parts of Solvesso 150 (Esso), 2 parts of methylisobutylketone, 2 parts of butylacetate, 2 parts of an auxiliary agent for lacquers; ration of acrylic resin to melamine resin = 64.4:34.6.

A white lacquer is prepared in the same manner with titanium dioxide (rutile) using a pigment/binder ratio of 1:1.7. The colored lacquer and the white lacquer are mixed in a ratio of 10:90 (colored pigment to white pigment).

The lacquer so obtained is subjected to the spraying-pouring-rubbing test for flocculation and comparison is made with a lacquer prepared in the same manner, but with an untreated pigment. The coatings of lacquer were cured for 30 minutes at 130° C. The test clearly shows that the pigment treated with nitrocellulose is superior to the untreated pigment in respect of stability towards flocculation.

EXAMPLE 2

Thirty six parts of the pigment of the formula

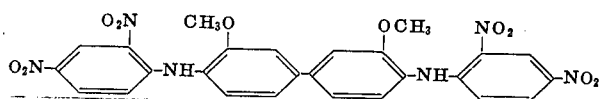

and 144 parts of sodium chloride are mixed with a solution consisting of 4.0 parts of cellulose nitrate (nitrogen content: 10.8 percent), 1.0 part of dibutyl phthalate, 70.0 parts of isopropanol and 30.0 parts of ethylene glycol monoethyl ether, and the whole is kneaded for 5 hours in a divided trough kneader. Two hundred parts of water are then added to the batch, the suspension is filtered and then washed with water until free from salt. Drying is carried out as described in example 1.

A nonflocculating brown lacquer can be prepared from the pigment preparation so obtained.

EXAMPLE 3

Thirty parts of the dry pigment powder containing cellulose nitrate obtained in accordance with example 2 are kneaded for 1 hour at 40 to 60° C. in a divided trough kneader together with 37 parts of a saturated polyamide derived from a dimerized unsaturated fatty acid and a polyamine (Versamid 930) in the presence of 5 parts of isopropanol and 3 parts of ethylene glycol monoethyl ether. Granulation is then effected by the addition of 100 parts of water. The granulate obtained is isolated by filtration and dried. It is then comminuted with the usual media.

Preparations having the same good properties may be obtained when the crude pigment is kneaded together with the nitrocellulose solution and the sodium chloride in one operation in accordance with example 2, the polyamide is added to the batch, kneading is continued and the mixture is then treated with water to remove the salt and solvent.

Kneading of the pigment with the cellulose nitrate and the polyamide may also be carried out simultaneously instead of successively.

EXAMPLE 4

Ten parts of the pigment of the formula

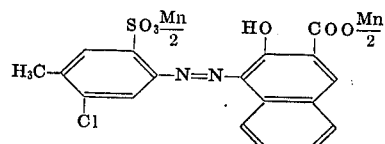

are added to 150 parts of 95 percent ethanol placed in a vessel provided with stirring means and dispersed for 15 minutes by means of a toothed-disc mill. A solution consisting of 0.5 part of cellulose nitrate (nitrogen content: 10.8 percent), 3.5 parts of ethanol 95 percent and 1 part of ethylene glycol monoethyl ether is then added. After stirring for 5 minutes, 200 parts of water are added while constantly stirring, whereby the cellulose nitrate precipitates on to the pigment. Further processing is carried out as described in example 1.

A nonflocculating red lacquer can be prepared with the preparation so obtained.

EXAMPLE 5

Ten parts of the pigment of the formula

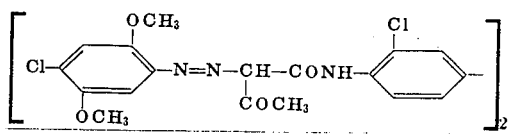

are added to 150 parts of ethylene glycol monomethyl ether as described in example 4, and dispersed for 15 minutes in a toothed-disc mill. A solution consisting of 0.5 part of cellulose nitrate (nitrogen content: 11.8 percent) in 4.6 parts of ethylene glycol monoethyl ether is then added. Precipitation and working up are carried out as described in example 4.

A nonflocculating yellow lacquer can be prepared with the preparation so obtained.

EXAMPLE 6

Forty-eight parts of the pigment used in example 2 and 150 parts of sodium chloride are kneaded for 5 hours in a divided trough kneader together with 8 parts of cellulose nitrate (nitrogen content: 10.8 percent), 2 parts of dibutyl phthalate, 22 parts of cellulose ethyl ether (ethylcellulose N–7, Hercules Powder) and 50 parts of diacetone alcohol. The batch is then precipitated with 200 parts of water, the granulated product is isolated by filtration, washed until free from salt and then dried in a vacuum drying cabinet at 60° C. under a pressure of 15 mm. Hg.

EXAMPLE 7

Two and five-tenths parts of the pigment preparation obtained as described in example 1 are ground for 16 hours in a ball mill in 37.5 parts of a clear alkyd-melamine lacquer in the presence of 0.5 of a 0.1 percent solution of a commercially available silicone-based flow-promoting agent. Composition of the alkyd-melamine lacquer:

46.7 parts of a 60 percent xylene solution of a short coconut alkyd resin (Duraplex ND 78, Rhöm und Haas Co.), 16.0 parts of butylated melamine-formaldehyde resin (Cibamin M 96, CIBA Ltd.), 30.0 parts of xylene and 7.3 parts of n-butanol. Ratio of alkyd resin to melamine resin = 70:30.

A white lacquer is prepared with titanium dioxide (rutile) in the same manner using a pigment/binder ratio of 1:1.8. The white and colored lacquers are mixed so that the ratio of color pigment to white pigment is 10:90.

The lacquer so obtained is tested for flocculation by the known spraying-pouring-rubbing test. The coatings of lacquer were cured for 60 minutes at 120° C.

A lacquer was prepared in the same manner using the untreated β-copper-phthalocyanine mentioned in example 1 and tested for flocculation.

Whereas the pigment preparation obtained in the manner described in example 1 displayed practically no flocculation, the untreated pigment showed extensive flocculation, which was indicated, inter alia, by a reduction in tinctorial strength.

EXAMPLE 8

Five parts of a pigment preparation made as described in example 1 with a pigment of the formula

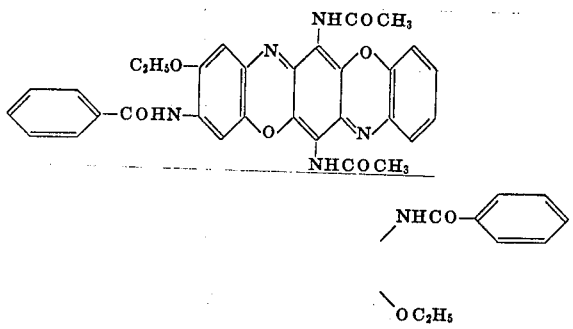

are ground for 16 hours in a ball mill in 95 parts of a commercially available alkyd lacquer which dries by oxidation.

A white lacquer is prepared with titanium dioxide using a pigment/binder ratio of 1:1.75. The white and colored lacquers are mixed so that the ratio of color pigment to white pigment is 10:90.

The lacquer so obtained is tested for flocculation by the test described in example 1 and compared with a lacquer prepared in the same manner with an untreated pigment. The test clearly shows that the pigment treated with nitrocellulose is superior to the untreated pigment in respect of stability towards flocculation.

Similar results are obtained when pigment preparations are made by the process described in example 1 using the pigment of the formula

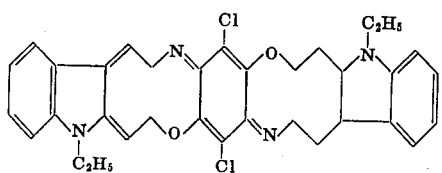

EXAMPLE 9

Twenty-five parts of the product obtained as described in example 3 are stirred into a solution of 12 parts of a saturated reaction product obtained from a dimerized unsaturated fatty acid and a polyamine in 42 parts of isopropanol and 42 parts of n-heptane, and dispersed for 30 minutes in a toothed-disc mill. The pigment dispersion so obtained may be used as a printing ink for paper, metal, and plastics (Printing Ink A).

A pigment dispersion is prepared in the same manner with a product made in accordance with example 3, but without using a pigment prepared in the manner described in example 2; the pigment used has the same chemical composition as the pigment in example 2 (Printing Ink B).

In contrast with Printing Ink A, Printing Ink B shows flocculation which can be seen through a microscope and which leads to sedimentation after a prolonged period of storage.

Printing Ink B also shows distinctly unfavorable rheological behavior (pronounced intrinsic viscosity), a low degree of transparency and poor gloss when printed.

EXAMPLE 10

Ten parts of the product obtained as described in example 6 are stirred into a solution of the following composition in known manner by means of a high-speed stirrer: five parts of cellulose ethyl ether having a degree of ethylation of 48.0–49.5 percent, 5 parts of cyclohexanone-formaldehyde condensation product, 10 parts of ethylene glycol monoethyl ether, 40 parts of methyl ethyl ketone and 30 parts of 95 percent ethanol.

The pigment dispersion obtained after stirring for 30 minutes may be used as a printing ink for paper, aluminum and cellophane (Printing Ink A).

A pigment dispersion is prepared in the same manner with a product made by the same procedure as that described in example 6, but in which the cellulose nitrate was replaced by the same amount of cellulose ethyl ether (Printing Ink B). In both the test and in use, printing Ink B shows clearly visible flocculation, unfavorable rheological behavior (pronounced intrinsic viscosity), a low degree of transparency and poor gloss caused by the flocculation.

EXAMPLE 11

Twenty parts of the pigment of the formula

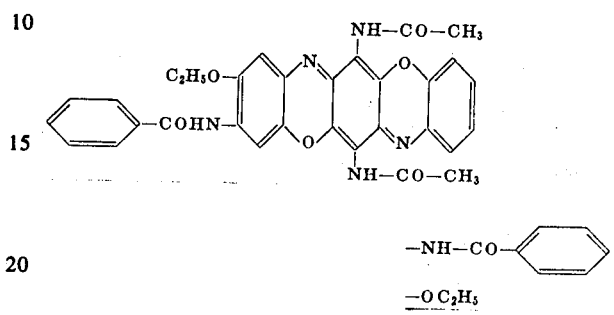

and 160 parts of finely pulverized sodium chloride, after addition of 2 parts of cellulose nitrate in the form of chips (nitrogen content: 10.8 percent), are mixed with 33 parts of ethylene glycol in a divided trough kneader capable of being heated and cooled. A homogeous, viscous dough forms after some time and kneading is continued for 7 hours at 45° C. Twenty parts of water are added to the paste so obtained, a suspension thereof is formed in 1,500 parts of water in a vessel provided with stirring means and the suspension is stirred for 1 hour at 80° C. The suspension is filtered and the finely divided pigment is washed until free from salt. Drying is carried out at 80° C. under a pressure of 15 mm. Hg. A violet pigment is obtained which in contrast to the crude pigment has greater tinctorial strength and which does not flocculate in alkyd-melamine stoving lacquers.

A test lacquer is prepared as described in examples 7 and 8, and flocculation behavior is determined by the spraying-pouring-rubbing test.

For comparison purposes the crude pigment is processed for 7 hours in the kneader in the manner described without the addition of cellulose nitrate, worked up and then incorporated in a test lacquer of the same kind. The spraying-pouring-rubbing test clearly shows that the pigment treated in the presence of nitrocellulose is superior to the untreated pigment in respect of stability towards flocculation.

EXAMPLE 12

Thirty-five parts of the pigment used in example 11 and 616 parts of finely ground sodium chloride are mixed with 242 parts of isopropyl alcohol by means of a high-speed disc stirrer of the kind used in the conventional sand mill. Thirty parts of a solution of cellulose nitrate in acetone, which contains 3.5 parts of dissolved nitrocellulose chips (nitrogen content: 10.80 percent) are added to the flowable pigment-salt suspension. The nitrocellulose precipitates in the ground material in the form of a fine suspension. Grinding is carried out for 12 hours at 1,900 r.p.m. while cooling.

The ground material is intensively processed for 15 minutes in 3,000 parts of water at 60° C. by means of a high-speed stirrer, the pigment is isolated by filtration and then washed until free from salt.

The moist press cake can either by dried at 70° C. under a pressure of 15 mm. Hg or subjected to spray drying in a 5 to 8 percent suspension.

Compared with the starting material, the finely divided pigment powder so obtained displays much better coloristic properties, and somewhat better coloristic properties compared with the product obtained in example 11. It is nonflocculating.

When the crude product is subjected to solvent salt grinding in the same manner, but without the addition of cellulose nitrate, a product is obtained which the test lacquer and the spraying-pouring-rubbing test clearly show to be inferior in respect of stability towards flocculation.

We claim:

1. A method for making a nonflocculating pigment which comprises intimately mixing a pigment with a solution of nitrocellulose in a water-miscible solvent, said solution being employed in and amount sufficient to provide from 2 to 20 parts by weight of nitrocellulose per 100 parts by weight of pigment, thereafter adding water to precipitate said mixture, and recovering the precipitated product.

2. A method according to claim 1 in which the pigment is mixed with the nitrocellulose solution by kneading, the nitrocellulose solution providing from 1 to 12 parts by weight of nitrocellulose per 100 parts by weight of pigment.

3. A method according to claim 1 in which a polyamide or a cellulose ether is incorporated in the nitrocellulose-pigment mixture prior to addition of said water.

* * * * *